J. F. METTEN.
GLAND PIPING SYSTEM.
APPLICATION FILED FEB. 15, 1909.
1,042,810.
Patented Oct. 29, 1912.
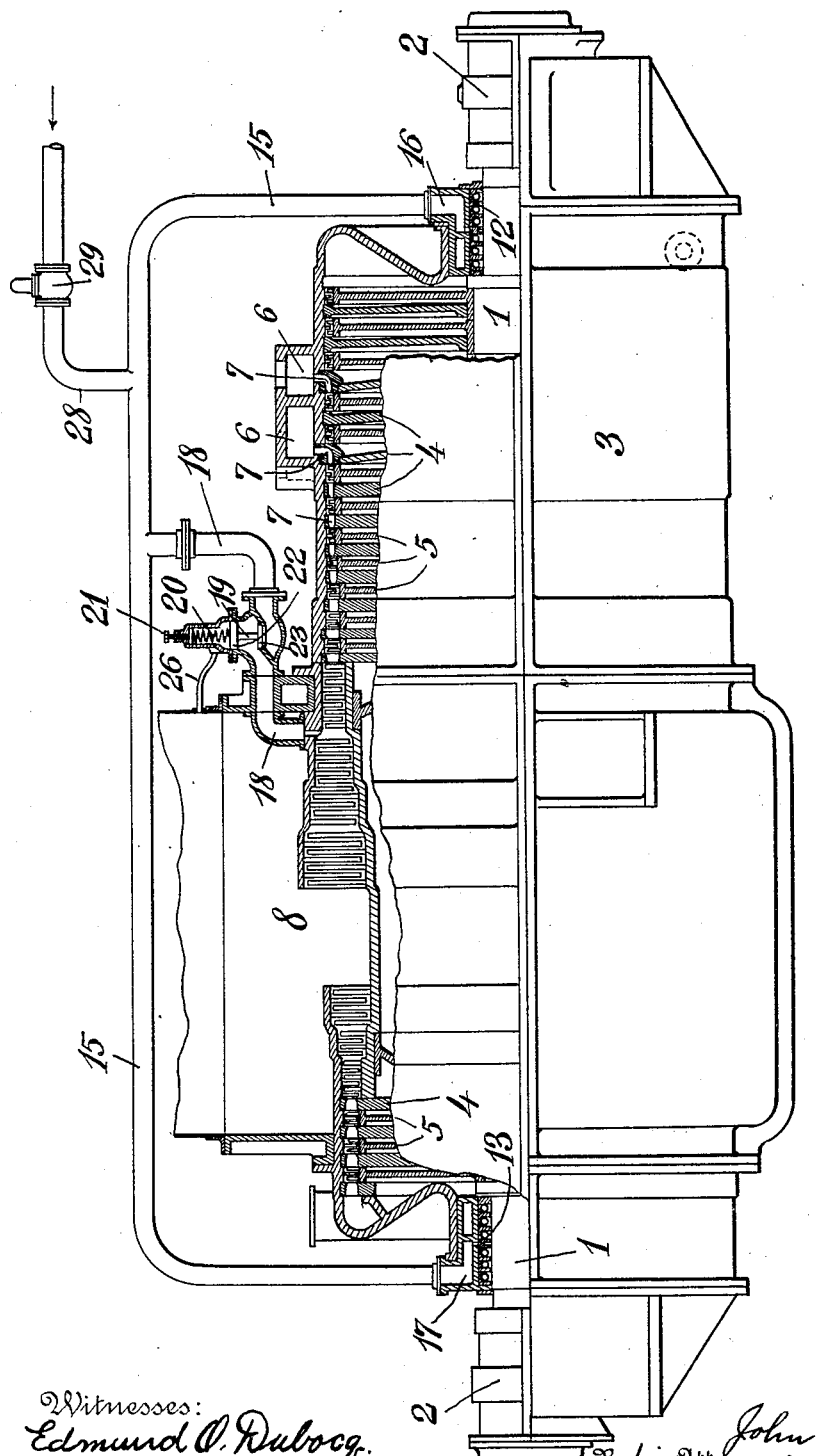

UNITED STATES PATENT OFFICE.

JOHN F. METTEN, OF PHILADELPHIA, PENNSYLVANIA, ASSIGNOR TO THE WM. CRAMP & SONS SHIP & ENGINE BUILDING COMPANY, A CORPORATION OF PENNSYLVANIA.

GLAND PIPING SYSTEM.

1,042,810.   Specification of Letters Patent.   Patented Oct. 29, 1912.

Application filed February 15, 1909. Serial No. 478,057.

*To all whom it may concern:*

Be it known that I, JOHN F. METTEN, a citizen of the United States, residing at Philadelphia, in the county of Philadelphia and State of Pennsylvania, have invented certain new and useful Improvements in Gland Piping Systems, of which the following is a full, clear, and exact specification.

This invention relates to gland piping system for turbines and has particular reference to an apparatus whereby the pressure on the glands of an elastic fluid turbine can be maintained at a predetermined amount, irrespective of the operation of the turbine.

In an elastic fluid expansion turbine, the gland on the high pressure end of the turbine is subjected at its inner side to the working pressure, while the gland on the low pressure, or exhaust side, is subjected to an external pressure by reason of the vacuum of the condenser. When the turbine is stationary, both glands are under external pressure due to the vacuum of the condenser. In order to prevent air leaking through the glands exposed to vacuum when the turbine is running, and through both the glands when the turbine is stationary, it is desirable to maintain a pressure on the glands sufficient to overcome this tendency, which, in the case of a vacuum equal to 2 lbs. pressure, would require an absolute external pressure on the glands of about 17 lbs. When the turbine is running there will be a tendency for the high pressure steam to leak outwardly through the high pressure gland as well as a tendency for air to be drawn into the condenser through the low pressure gland. Also, in the case of a reversing turbine, the high pressure gland, when the turbine is going in a forward direction becomes the low pressure gland when the turbine is reversed, and vice versa with the low pressure gland.

It is the object of this invention to provide an automatically controlled gland piping system whereby the external pressure on the two glands will be at all times equalized, irrespective of the movement or direction of rotation of the turbine.

In carrying out the invention so as to maintain the required absolute external pressure on the pockets of the high and low pressure glands, a balanced relief valve is provided having a connection preferably to one of the expansion stages and an equalizing pipe connecting both glands so that as long as the leakage from the high pressure gland is sufficient to maintain a predetermined pressure on the low pressure gland, the relief valve is closed, but when the leakage pressure is more than sufficient, the relief valve opens and admits the excess pressure to the intermediate expansion stage so as to perform useful work in the turbine. When the leakage pressure is insufficient, or when the turbine is standing idle, a reducing valve connected between the source of steam pressure and the equalizing passage automatically operates to supply steam under the predetermined pressure to both glands.

The invention will be more fully understood in connection with the description of accompanying drawing which shows a turbine in partial longitudinal section embodying the invention.

1 represents the shaft supported in bearings 2, 2.

3 is a stationary casing, 4 are stationary partitions carried thereby separating the expansion stages, and 5 are the rotors carried by the shaft 1.

6, 6 are steam inlets discharging into the expansion stages 7, it being understood that the casing and rotors are to be provided with suitable blading and nozzles.

8 is the exhaust chamber which will preferably be connected with a condenser, not shown in the drawing.

Also mounted on the end of the shaft 1 is a smaller reversing turbine similarly constructed and arranged that it will be supplied with steam to rotate the shaft in a reverse direction in case of necessity.

12 and 13 are end glands which are carried by the casing and constructed to bear closely on the shaft so as to prevent excessive loss of steam power from within the casing, or substantial passage of air into the casing when under vacuum. When the turbine is running in a forward direction, gland 12 will be subjected internally to the working steam pressure, while the gland 13 will be subject to the vacuum of the condenser, which tends to draw in air. When the turbine is stationary both glands will be subject to the vacuum of the condenser, and when the turbine is running in a reversed direction the gland 13 will be a high pressure gland, and the gland 12 will be subject to the vacuum of the condenser. Under all of these conditions it is the object of this invention to provide a predetermined pressure on the glands. There will be a tendency for the high pressure steam to leak through the high pressure gland, and to utilize this leakage on the low pressure gland, an equalizing pipe 15 is provided which extends from the pocket 16 of the gland 12 around the turbine to the pocket 17 of the gland 13. If now there is sufficient leakage of steam outwardly through the gland 12, the excess pressure will pass through the pipe 15 to the gland 13, and thus prevent any indrawing of air at the low pressure end. Also, when the turbine is reversed, the high pressure leakage will pass through the gland 13 and be conducted to the now low pressure gland 12.

In order to maintain a predetermined exterior pressure at all times on the glands, the by-pass 18 is connected between the pipe 15 and one of the expansion stages having, under normal running conditions, a pressure equal to that to be maintained on the glands. Located on the pipe 18 is a balanced relief valve 19 held seated by a spring 20 which can be adjusted by a set screw 21, the valve 19 consisting of a stem and upper piston 22 and a lower piston 23. Inasmuch as pistons 22 and 23 balance each other it will be seen that the pressure from the intermediate stage, to which the pipe 18 is connected, will not tend to open the valve. The lower side of piston 23, however, will be subjected to the pressure in pipes 15 and 18, and when the pressure in pipe 15 exceeds the tension of the spring 20, it will open the relief valve and pass to the intermediate stage through the pipe 18, to perform useful work in the turbine, thus effecting an economy of steam. From piston 22 a pipe 26 leads to the exhaust 8, so that variation of pressure in the expansion stage to which the relief passage 18 discharges, will not affect the pressure upon the glands. A similar relief valve connected with an intermediate stage can be likewise provided for the reversing turbine if desired, but ordinarily the reversing turbine is not operated very frequently or for such a period of time as to warrant this duplication. When the turbine is at rest, the vacuum is ordinarily maintained at the exhaust, so that it is desirable to provide an absolute pressure at the glands sufficient to prevent entrance of air on account of the vacuum. In order to accomplish this and to supply additional pressure, if the leakage is insufficient, I have provided an auxiliary pipe 28 containing a reducing valve 29, connected to the main or an auxiliary steam line, and set so as to supply low pressure steam at a slightly lower pressure than that at which the relief valve 19 opens, so that no steam will be delivered from the auxiliary supply until the leakage from the high pressure gland is insufficient to supply the low pressure gland, or when both glands are under vacuum, as is the case when the turbine is stopped.

It will be understood that the invention may be applied to turbines having more than two glands, if desired, and also to non-condensing turbines, where it is desired to maintain a constant external pressure. Also that by adjusting the valves, the predetermined pressure to be maintained may be varied according to the requirements of actual practice.

It will therefore be seen from the foregoing description that I have provided a gland piping system wherein the pressure on the glands is automatically maintained at all times at a predetermined amount, whether the turbine be running in one or the other direction or idle, and also wherein any excessive leakage through the high pressure gland is automatically turned back into the turbine at an intermediate stage and permitted to perform useful work.

Modifications and changes in the construction and arrangement of the parts herein described may be made without departing from the scope of the invention.

Having now described my invention I declare that what I claim as new and desire to secure by Letters Patent is:—

1. The combination with a multiple stage turbine having a high and a low pressure gland, of means connecting said glands whereby to equalize the pressure on said glands, and automatic means whereby any excess equalizing pressure from the high pressure gland and over a predetermined amount is admitted to an intermediate stage of the turbine to supply power.

2. The combination with a multiple stage reversing turbine having a gland at each end, of means connecting said glands whereby to at all times equalize the pressure on said glands, and automatic means whereby any excess of equalizing pressure over a predetermined amount is admitted to the turbine at an intermediate stage having a corresponding pressure to supply power.

3. The combination with a turbine having a gland at each end, of means for automatically maintaining pressure at all times on said glands, and means whereby any excess of leakage pressure is admitted to the turbine to perform work.

4. The combination with a turbine having a plurality of glands, of a by-pass around the turbine connecting said glands, means for maintaining a predetermined leakage pressure on said glands, means whereby excess of pressure is automatically admitted to the turbine to perform work, and means for admitting auxiliary pressure when the turbine is at rest.

5. The combination with a multi-stage turbine having a gland at each end normally subject to unequal pressures, and a by-pass around the turbine connecting said glands, of means controlling a source of steam for maintaining a predetermined pressure in said by-pass independently of the amount of leakage into said by-pass from the gland subject to the greater pressure, a passage between said by-pass and one of the intermediate stages of the turbine having a pressure less than the predetermined by-pass pressure, and a valve in said passage subject to the pressure of said by-pass on one side and on the other to a pressure equal to said predetermined pressure, said valve opening to admit excess pressure from the by-pass to said intermediate stage.

In testimony whereof I affix my signature, in presence of two witnesses.

JOHN F. METTEN.

Witnesses:
 ISAAC ARROTT,
 HERBERT CRAMP.

Copies of this patent may be obtained for five cents each, by addressing the "Commissioner of Patents, Washington, D. C."